US006006610A

United States Patent [19]
Lehnert

[11] Patent Number: 6,006,610
[45] Date of Patent: Dec. 28, 1999

[54] ARRANGEMENT OF A SENSOR HOUSING ON A WALL

[75] Inventor: Gunter Lehnert, Russelsheim, Germany

[73] Assignee: General Motors Corporation, Detroit, Mich.

[21] Appl. No.: 09/037,597

[22] Filed: Mar. 10, 1998

[30] Foreign Application Priority Data

Apr. 15, 1997 [DE] Germany ............................ 197 15 556

[51] Int. Cl.$^6$ ...................................................... G01L 3/00
[52] U.S. Cl. ........................... 73/862.08; 73/761; 73/760
[58] Field of Search ................................. 73/761, 862.08, 73/760

[56] References Cited

U.S. PATENT DOCUMENTS

| | | | |
|---|---|---|---|
| 3,974,685 | 8/1976 | Walker | 73/761 |
| 4,090,399 | 5/1978 | Babcock | 73/761 |
| 4,636,120 | 1/1987 | Brandsberg et al. | 73/761 |
| 5,721,380 | 2/1998 | Gozlan | 73/761 |
| 5,783,751 | 7/1998 | Maw et al. | 73/761 |

*Primary Examiner*—Max Noori
*Attorney, Agent, or Firm*—Margaret A. Dobrowitsky

[57] ABSTRACT

The invention pertains to the arrangement of a sensor housing (5) on a wall (2) on which the sensor housing (5) is held by means of a threaded nipple (4) in a tapped hole (3). In order to protect the sensor housing against disturbing environmental factors, especially dirt, moisture and wind without impairing the accessibility of torque transmitting features adjacent to the threaded nipple (4), an attachment (12) arranged on the wall (2) centrally around the sensor housing (5) is provided on whose cylindrical surface (13) facing toward the inner side the edge (15) of a soft elastic washer (14) engages. The washer also is sealably connected to the sensor housing (5). The washer (14) and the attachment (12) form a chamber (16) encapsulating the sensor housing (5). When a tool is positioned on the torque transmitting features the washer (14) yields elastically. Additional encapsulation is unnecessary to protect the sensor housing (5). The mounting activity is not impaired by the protection provided.

5 Claims, 1 Drawing Sheet

ARRANGEMENT OF A SENSOR HOUSING ON A WALL

TECHNICAL FIELD

This invention pertains to an arrangement of a sensor housing on a wall.

BACKGROUND OF THE INVENTION

Especially in the case of heat sensors such as are used to switch on a cooling fan in motor vehicles and the heat exchangers provided in the engine compartment of the motor vehicle for cooling the internal combustion engine, the problem exists that the switching sensitivity and switching accuracy of the sensor are impaired during driving operations by dirt, moisture and moving air on the sensor housing. Premature switching on or late switching off of the cooling fan is the result with various undesireable negative effects.

It is known that a sensor housing provided with such a heat sensor can be covered by a capsule and thus protected against disturbing external influences. However, after the installation of the sensor housing an additional assembly process is required for this.

Since the wall of sensor housing for functional reasons frequently cannot be made in arbitrary thickness and since reinforcement of the sensor housing will also increase the weight, it is not possible directly to pass the forces applied during the installation of the sensor housing through the housing. Rather generally one attempts to apply the installation forces directly to a socket of the sensor housing. With this approach, deformation of the sensor housing due to high assembly forces can be safely avoided even if the housing for functional reasons or for purposes of weight reduction is made thin walled. As a result the encapsulation of the sensor housing is made more difficult since at least during installation the socket lying against the wall must be accessible to a tool.

SUMMARY OF THE INVENTION

The invention has the objective of assuring the fixation of the sensor housing on a wall while simultaneously and without additional installation work encapsulating the sensor housing.

A collar-like attachment is provided as part of the wall centrally around the tapped hole bored into the wall and therefore also around the sensor housing. Part of the encapsulation of the sensor housing is created by an elastic washer connected to the sensor housing thus completing the encapsulation of the sensor housing.

The sensor housing, despite this encapsulation, can be screwed in with a tool acting directly on the socket, e.g., a socket wrench, by deforming the washer elastically within the well of the socket wrench. After this fixation process and the removal of the tool from the socket the washer, because of its elasticity, straightens out again and lies with its outer edge on the inner cylindrical surface of the collar-like attachment. In this way the space inside the attachment and the washer which also contains the essential parts of the sensor housing is protected against external factors. Despite this encapsulation of the essential parts of the sensor housing the front side lying outside the washer remains freely accessible for attaching an electrical connection.

BRIEF DESCRIPTION OF THE DRAWINGS

The present invention will now be described with reference to the accompanying drawings, in which.

DESCRIPTION OF THE PREFERRED EMBODIMENT

Figure 2:
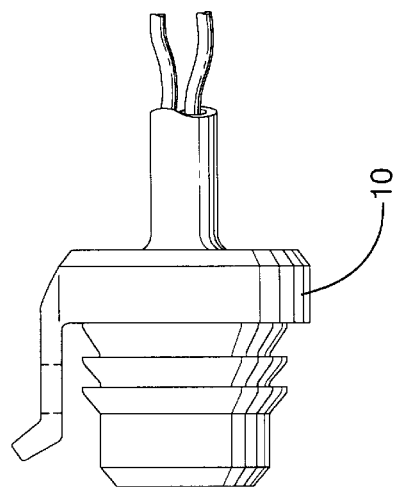
FIG. 2 shows an electrical plug connection for the sensor housing in FIG. 1.

The water space 1 of the water compartment provided for cooling an internal combustion engine is bounded by a wall 2 in which a tapped hole 3 is located. In this tapped hole 3 a threaded adapter nipple 4 of a sensor housing 5 is screwed in. The sensor housing 5 includes, besides the threaded fixture 4, a socket 6 close to the threaded fixture 4, a cylindrical housing part 7 and a plug connection part 8. In the threaded nipple 4, facing the water chamber 1, a heat sensor is conventionally situated, e.g., in the form of a bimetal snap spring which acts on a thermal-lag switch located in the cylindrical housing part 7 in such a way that when a certain water temperature is reached in the water space 1 the thermal-lag switch is closed or opened. The switch contacts are connected to electrical connections 9 in the plug connection part 8. A plug connection 10 can be attached onto the plug connecting part 8 (FIG. 2), which is provided with contacts corresponding to the connections 9 and can be connected via the thermal-lag switch to a circuit of a fan motor.

The socket 6 is provided on its outer circumference with a hexagonal shape to accept a wrench. A gasket 11 is positioned between the socket 6 and the wall 2.

On the wall 2 centrally around the tapped hole 3, and therefore also around the sensor housing 5, a collar-like attachment 12 extends axially up to the plug connection part 8. The attachment 12 forms on its inner side a cylindrical surface 13 which surrounds the socket 6 and the cylindrical housing part 7 at a distance. The distance is such that between the cylindrical surface 13 and the hexagon of the socket 6 a socket wrench can be inserted as a tool for mounting the sensor housing 5.

On the outer circumference of the cylindrical housing part 7 a washer 14 consisting of a soft elastic material, e.g., of rubber is mounted. The washer 14 is of such dimensions that it lies with its outer edge 15 on the surface 13 under a slight tension or interference. The attachment 12 and the washer 14 together form a space 16 in which the sensitive parts of the sensor housing 5 are encapsulated.

Figure 1:
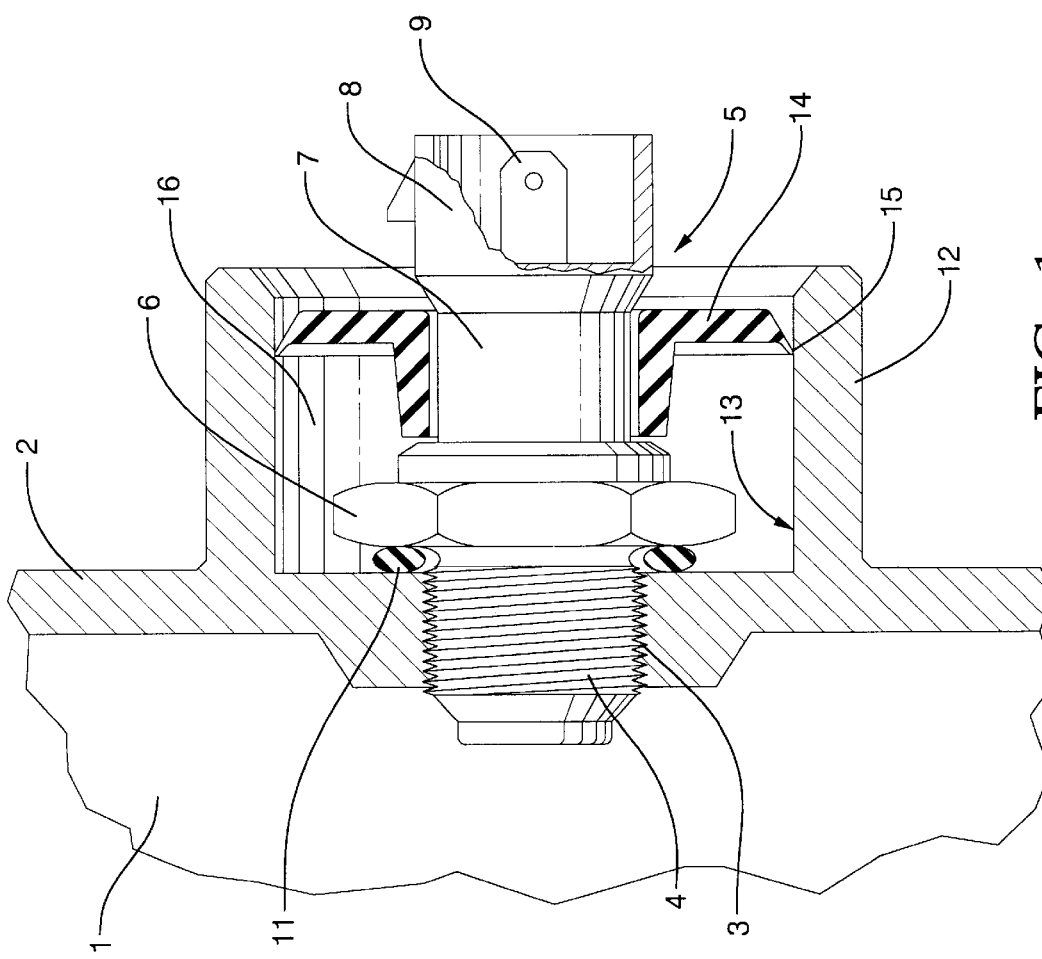
FIG. 1 shows a sensor housing designed as a temperature sensor incorporated in the wall of a water compartment.

During installation or removal of the sensor housing 5 a mounting tool in the form of a socket wrench can be positioned over the plug connecting part 8 and past the cylindrical housing part 7 onto the hexagon of the socket 6, at which time the washer 14 yields elastically under relatively low pressure as indicated by the broken line in FIG. 1. The torque applied with the mounting tool for tightening or loosening the sensor housing 5 can therefore act directly on the socket 6 adjacent to the threaded nipple 4. There is no risk of deformation of the sensor housing 5.

After completion of the assembly operation and removal of the tool the washer 14, because of its elasticity, lies with its edge 15 again on the side surface 13 and closes the space 16 against external disturbing factors. Therefore the sensor housing 5 is protected against disturbing factors, but this protection does not interfere with its installation.

I claim:

1. An arrangement of a sensor housing on a wall wherein the sensor housing is adapted for threaded engagement into a hole in the wall, the arrangement comprising:

a torque applying feature on the sensor housing adapted for engagement with a torque applying tool for rotating the sensor housing relative to the wall to install and remove the sensor housing;

an internal cylindrical surface extending from the wall and centrally located in spaced adjacency around the sensor housing to define a well; and a flexible washer sealably coupled to a portion of the sensor housing such that the torque applying feature on the sensor housing is located intermediate the wall and the washer, said flexible washer extending outward from the sensor housing to sealably engage the internal cylindrical surface in a relaxed position, said flexible washer yieldable in a manner to allow the torque applying tool within the wall to deform the flexible washer and pass between the flexible washer and cylindrical surface without interfering with the application of the torque applying tool to the torque applying feature and further in a manner to return to the relaxed position upon removal of the torque applying tool from the well.

2. An arrangement of a sensor housing on a wall as claimed in claim 1 wherein the torque applying feature on the sensor housing comprises a multifaceted periphery adapted for engagement with the torque applying tool including a socket.

3. An arrangement of a sensor housing on a wall as claimed in claim 1 wherein the sensor housing further comprises an electrical connector exposed on the side of the washer opposite the wall.

4. An arrangement of a sensor housing on a wall as claimed in claim 1 wherein the flexible washer comprises a flexible annulus having a central aperture sized for sealably coupling to a substantially cylindrical portion of the sensor housing.

5. An arrangement of a sensor housing on a wall as claimed in claim 4 wherein the substantially cylindrical portion of the sensor housing is intermediate the torque applying feature and an electrical connector.

* * * * *